Patented July 1, 1947

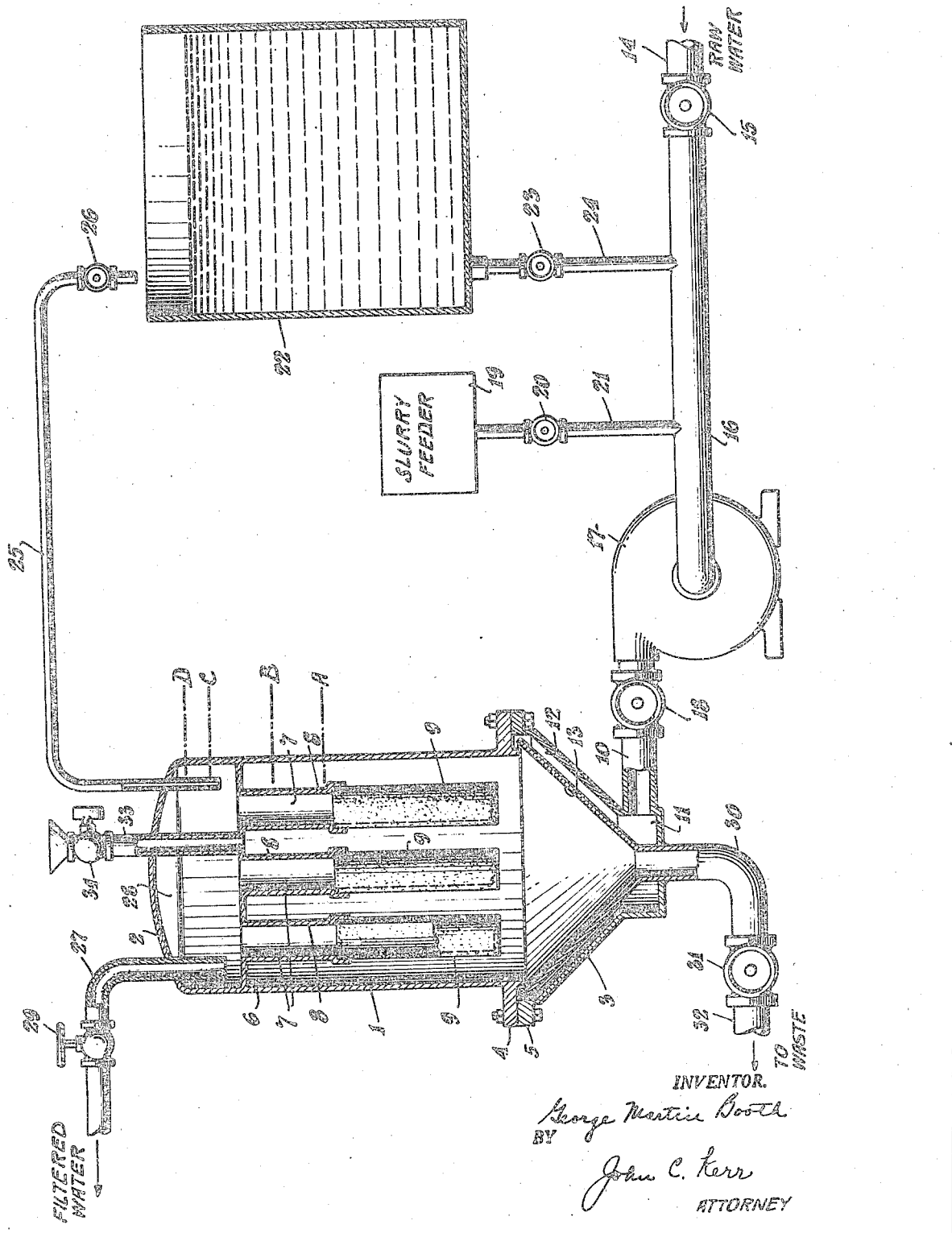

2,423,172

UNITED STATES PATENT OFFICE 2,423,172

BACKWASHING MEANS FOR FILTERING APPARATUS BY REVERSE FLOW OF FILTRATE

George Martin Booth, Westfield, N. J., assignor to Wallace & Tiernan Co., Inc., Belleville, N. J., a corporation of New York Application April 19, 1944, Serial No. 531,757

5 Claims. (Cl. 210—144)

This invention relates to filters and has for its principal object to provide a filter of such design that it may not only be assembled and operated efficiently, but may also be quickly and effectively cleaned.

The invention is particularly advantageous when applied to filtering apparatus using diatomaceous earth as the filtering material. This diatomaceous earth is built up on filter-supports which may be fine wire cloth or a porous stone such as that commonly employed in making grindstones or it may be a fluted spool helically wound with closely spaced wire or of other forms providing suitable openings through which the liquid to be filtered may flow.

The filter material may be built up on the filter supports by forming a slurry of the diatomaceous earth in a portion of the liquid to be filtered and passing the slurry through the porous elements to cause the earth in suspension to collect on the porous elements. Preferably the particles of diatomaceous earth are much smaller than the openings through the porous elements and the retention of the particles of earth on the porous elements results from their collecting together to form arches across the openings in the filter-supports upon which arches more particles of the earth collect to form the filter bed. Excellent filtration may be accomplished through such a bed of diatomaceous earth so formed on the porous elements constituting their supports. A few examples of the many liquids which may be satisfactorily and effectively filtered by this method and these means are varnishes, oils, chemical solutions of various sorts, liquid waxes and many edible or potable liquids such as milk, beer, syrups, fruit juices and water. The actual quality of the filtration is dependent on the fineness of the diatomaceous earth employed since a bed of fine diatomaceous earth contains smaller openings through which the liquid being filtered must pass, than a bed of comparatively coarser earth. The type of turbidity which it is desired to remove from the liquid being filtered is also a determining factor.

In practicing the present invention I prefer to build up a precoat of diatomaceous earth on the filter-supports and also to add diatomaceous earth during the filtering operation, so that the turbidity being removed by the earth is distributed through an ever increasing layer of the earth on its supports. This addition of the earth during filtration produces a body coat. The purpose of this body coat is to present continually a new porous surface to the liquid being filtered, upon which surface turbidity causing particles may be collected. The rate of addition of the body coat is preferably such as to maintain continually a porous filter bed, thereby prolonging the available length of filter run. Normally filtration is carried on until the friction loss through the diatomaceous earth and suspended matter trapped therein increases to such a point that it is no longer economical to continue the filtering operation. When this point is reached, the porous filter-supports must be cleaned by removing the diatomaceous earth and other foreign particles. Even though the particles of earth are smaller than the openings in the porous filter-supports, aggregates of these particles and particles of suspended matter in the liquid being filtered wedge in the openings in the porous filter-supports during filtering operation. If these particles are not removed at the end of a filtering run the restrictions which they form in the openings of the porous filter-supports would continue to build up in subsequent runs and tend to become more firmly cemented in the openings of the filter-supports during periods of shut-down until the porosity of the filter-supports would become seriously impaired, resulting in lower efficiency of the filtering apparatus due to the increased friction loss through the filter bed. The most effective cleaning of the porous filter-supports therefore requires not only that the bed of diatomaceous earth and entrained matter be removed from the surface of the filter-supports, but also that all particles or matter wedged in the openings of the filter-supports shall be removed.

One of the important objects of the present invention is to provide a method of effectively cleaning the filter-supports in situ and thereby avoid the time-consuming and laborious operations of disassembling the filter apparatus in order to obtain access to the filter-supports to remove and clean them.

According to the present invention, when practiced according to the now preferred method, a small portion of the liquid being filtered, i. e., a small portion of the filtrate, is used for cleaning the filter-supports. The preferred method of cleaning is effected by reversing the flow of liquid through the filter-supports and causing it to flow at a substantially higher velocity than that employed during the filtering operation, thereby to remove the bed of diatomaceous earth and entrained matter from the porous filter-supports with sufficient liquid to carry the spent diatomaceous earth and other particles out through a drain of the filter apparatus. If the liquid employed in the cleaning and draining process is of sufficient value it may be reclaimed by allowing the earth and entrained matter to settle out in a storage tank and the resulting liquid may then be re-filtered in a later filtering run.

Another object of the invention is to accomplish the cleaning of the filter-supports with a minimum of equipment and in a very short time and with comparatively little manipulation required of the operator.

While the invention in its broader aspects may be practiced in other ways and by means of other apparatus, within the scope of at least some of the appended claims, I shall now describe what I now consider to be a preferred form of apparatus for carrying the invention into practice.

In the drawing, I have illustrated in elevation, partly in section, a form of apparatus which has been found to be very satisfactory in operation and to give excellent results.

Referring to the drawing, the filtering apparatus comprises a container having two main compartments or chambers, one of which constitutes the filtrate compartment or effluent chamber and the other of which contains liquid to be filtered and may be termed an influent chamber, these two compartments being separated by the porous filter-supports. The container comprises a cylinder 1 having a somewhat dome-shaped top 2 and closed at its bottom by a cone-shaped member 3, which is shown detachably joined to the lower end of the cylinder 1 by suitable bolts in the flanges 4 and 5. The flange 4 may be secured to the hollow cylinder 1 by welding or the like and the flange 5 may be secured to the upper cylindrical portion of the cone 3 in similar manner. A horizontal tube sheet 6 is provided in the container in air-tight connection to the inner wall thereof. This tube sheet 6 is provided with a plurality of openings 7 in which tubes or pipes 8 are mounted with an air-tight connection. Porous filter-supports 9 are secured to the lower ends of the tubes 8. These filter-supports 9 are generally in the shape of hollow cylinders closed at their lower ends but provided with suitable openings in their cylindrical portion through which the liquid to be filtered may pass from the compartment containing the liquid to be filtered into the filtrate compartment. These filter-supports 9 may be constructed by perforating a cylindrical sheet and covering it with fine wire cloth. Porous stone tubes with their bottoms capped have also been found to be satisfactory. While the filter-supports 9 may be made in other shapes I prefer to make them cylindrical so that they will have comparatively high bursting and crushing strength.

The filtrate compartment or effluent chamber comprises the upper interior portion of the container 1, the inside of the tubes 8 and the inside of the filter-supports 9. The other compartment or influent chamber, i. e., the one in which liquid to be filtered is contained, comprises the interior of the container 1 below the tube sheet 6 and surrounding the tubes 8 and the filter-supports 9. As hereinafter pointed out, means are provided for preventing flow of liquid from one of the compartments into the other except through the openings in the porous filter-supports. The conical base 3 of the container communicates at its bottom end with a pipe 10 which constitutes the inlet to supply liquid to the container 1. The passage or pipe 10 communicates with the interior of the container 1 through an annular chamber 11 at the bottom of the cone 3.

The chamber 11, as shown, communicates with a conical annular space 12 between the cone 3 and a conical or funnel-shaped member 13, the construction being such that liquid entering through the pipe or passage 10 is evenly distributed around the outside of the cone 13 and enters the main container over the upper edge of the cone 13. The lower end of the cone or funnel 13 is provided with an outlet 30, 32 which may be opened or closed by means of a manually operable valve 31 for a purpose hereinafter appearing. Suffice it here to state that if liquid under pressure is supplied through the passage 10 and the valve 31 is open, the liquid flowing over the upper edge of the cone 13 and down the inner side wall of the latter will effectively wash the interior of the funnel 13 and remove any sediment which may be resting upon it.

While, as stated, the filtering apparatus may be used to filter other liquids, it is admirably adapted to filter raw water when the filtrate is intended to be used as a potable beverage, and I shall continue the description with the understanding that the invention is to be applied to that use.

Raw water is supplied to a pipe 14 to which a manually operable valve 15 is connected, the latter in turn being connected to a pipe 16 connected to the intake of a pump such as the centrifugal pump 17. The outlet of the pump 17 is adapted to supply raw water under pressure to the passage or pipe 10. A manually operable valve 18 is connected between the outlet end of the pump 17 and the inlet end of the pipe or passage 10 for a purpose hereinafter appearing. A slurry feeder 19 is connected to the raw water supply pipe 16 through a manually operable valve 20 and pipe 21. By operating the valve 20, the supply of slurry from the tank 19 to the pipe 16 may be shut off or regulated at will. A tank 22 adapted to contain filtered water is provided. This tank preferably has a volume slightly greater than the total volume of the container 1. The tank 22 is provided with an outlet connected to the raw water supply pipe 16 through a pipe 24 in which a manualy operable valve 23 is interposed. At certain times in the operation filtered water is supplied to the tank 22 through a pipe 25 which communicates with the upper interior portion of the container 1 and extends over the upper part of the tank 22. Flow of filtrate through the pipe 25 from the container 1 may be controlled by the manually operable valve 26 provided near the outlet end of the said pipe 25.

A filtrate outlet pipe 27 extends through the head 2 of the container 1 downward inside the filtrate chamber 28 and terminates at its lower end adjacent to the tube sheet 6. This filtrate pipe 27 is provided with a manually operable valve 29 for shut-off and throttling purposes. The drain pipe 32 leads to waste.

Preferably and for a purpose hereinafter appearing a pipe 33 is provided in communication at one end with the compartment which is below the tube sheet 6 and surrounds the filter-supports. This pipe 33 extends through the head 2 and terminates in a valve 34 which is of the quickly opening type when manually released. This valve 34 is of such construction that it may be opened completely in a small fraction of a second.

I shall now proceed with a description of the operation of the apparatus. With the container 1 empty, i. e., containing only air, the valves 23, 18 and 26 are opened and the valves 15, 31, 34, 29 and 20 are closed. The tank 22 has previously been filled with filtered or clear, clean water. The pump 17 is started so that water is pumped from the tank 22 into the container 1. Water rises within the container 1 to a level indicated approximately at A, trapping air above this level in the lower compartment of the container 1 under the tube sheet 6. The filtered water passes through the elements 9 up through the tubes 8 into the filtrate chamber 28 in which it rises to level C trapping air above this level and under the head 2 of the filtrate compartment of the container 1. The water flows from the container 1 through the pipe 25 back into the tank 22. At this time a suitable amount of diatomaceous earth is added to the water being circulated through the filtering apparatus. This may be done either by introducing the required quantity of the earth into the tank 22 directly or by opening the valve 20 and operating the slurry feeder 19 at a high rate for the required length of time in order to build up the desired bed of earth on the filter-supports 9. The feeder 19 feeds a slurry of diatomaceous earth to the water conveying pipe 16 when the valve 20 is open. After the desired quantity of diatomaceous earth has been introduced into the circulating system just described, and no more is to be added at that stage, the valve 20 is closed if it has been previously opened, and the circulation is continued until the water in the circulating loop becomes clear.

At this stage the valves 15 and 29 are opened, and valves 26 and 23 are closed, so that raw water is pumped into the bottom of the container 1, thence through the precoat of diatomaceous earth on the filter-supports 9, thence through the openings in the filter-supports, up through the filter-supports 9, through the tubes 8 into the upper part of the container 1, and finally out through the filter outlet 27. At some convenient time during the filtering run, the valve 23 may be opened long enough to allow the tank 22 to fill up with filtered water for a succeeding precoating operation.

The slurry feeder 19 may be operated to provide a continuous addition of diatomaceous earth to the raw water. When so operated, a body coat is built up continually on the filter-supports. In some instances the total quantity of liquid filtered may be increased four or five times over that which may be filtered when no body coat is added. If it is desired to halt filtration temporarily and still maintain the bed or coating of diatomaceous earth on the filter-supports 9, a relatively small flow of liquid may be circulated through the container 1 as in the precoating operation described above.

When the end of economical filtering operation or a filtering run has been reached, the valve 29 is closed and the pump 17 maintained in operation for a sufficient time, usually a few seconds, until the water level in the filtrate chamber 28 has risen to level D and the water in the other compartment of the container 1 under the tube 6 has risen to level B. The air in both compartments of the container 1 is then compressed to a pressure equal to that of the head developed at the discharge of the pump. The valve 18 is then closed and the pump may be cut off. No water is now flowing in any part of the system. The valves 18, 31, 29, 34 and 26 are all closed. The only way in which water may pass from the filtrate compartment 28 of the container 1 into the other compartment thereof, is through the openings in the filter-supports 9. The pressure in the upper and lower compartments of the container 1 is equal.

The valve 34 is next opened which permits the sudden escape of the compressed air between the level B and the tube sheet 6 in the lower compartment of the container 1. Immediately upon release of this pressure, the filtered water which had remained in chamber 28, tubes 8 and inside the filter-supports 9, is driven down through the tubes 8 into the filter-supports 9, and through the openings or pores of the latter with an extremely high velocity, by the other pocket of compressed air above the level D in the filtrate compartment. Immediately after the valve 34 has been opened the valve 31 is opened so that the diatomaceous earth and turbidity which is now loose from the filter-supports 9, drains to waste. While the container 1 is draining, air enters the container 1 through the valve 34. If upon draining, any sludge is left on the inner or upper surface of the cone 13 it may be washed down to waste by opening the valve 18 slightly and operating the pump 17.

Upon closing the valves 34 and 31 the system is again ready for precoating and re-use as above described.

The entire backwashing cleansing operation above described is one that requires little manipulation by the operator in that all that he had to do to effect the back-washing and draining was to close the valves 29 and 18 and to open the valves 34 and 31 in succession. Tests have shown that for a filtration unit constructed as illustrated and in which water has been filtered until the end of a filter run, a flow of approximately one hundred and twenty (120) gallons of liquid per minute per square foot of filtering area is required to effect a good and thorough cleansing job, whereas the normal maximum flow during actual filtration approximates eight (8) gallons per minute per square foot. Actual operation has demonstrated that backwashing effected as above described gives the required high rate of flow for the cleansing operation. The cleansing of the filter-supports is effected very quickly taking only one-tenth of a second to effect it. The pressures in the two compartments of the container 1 become equalized in about one-fifth of a second after the valves 34 and 31 have been opened to institute the backwashing.

Instead of employing the above described method of backwashing the following procedure may in some cases be employed. After the valves 29 and 18 have been closed, the drain valve may be opened with the valve 34 remaining closed. In this case the pressure in the lower compartment of the container 1 below the tube sheet 6 is released by the opening to drain. If this last described method of backwashing is to be employed the filter-supports 9 may be directly connected to the tube sheet 6 and the pipes 8 omitted so that substantially no air would be trapped in the lower compartment below the tube sheet 6. Also the valve 34 need not be a quick opening valve, but any suitable valve to permit air to re-enter the container 1 upon completion of the backwashing operation. However, experience has shown that in order to obtain a cleansing effect on the porous elements 9 as efficiently and comparable to that obtained by the method in which the quickly opening valve 34 is employed, there would be required a drain valve 31 having a very large area of opening (approximately forty times the area of opening of the valve 34) in order to pass the necessary rate of flow of water. In many and perhaps most installations the use of a drain valve of this size would be considered impractical.

In the use of the apparatus as first described above, during actual filtering operation the pressure in the lower compartment of the container 1 beneath the tube sheet 6 is of a comparatively low order at the start of a run, say from five (5) to eight (8) pounds per square inch, and approaches twenty-five (25) to thirty (30) pounds per square inch at the end of the run. When effecting the compression of the air in the two compartments as above described the pump 17 is run up to full capacity, so as to provide air pressure in the two compartments of the order of about thirty-five (35) pounds per square inch. When employing my improved method first described above, the flow during backwashing, i. e., the reverse flow, is effected at the rate of approximately one hundred and twenty (120) gallons per minute per square foot of filtering area, through the filter-supports, whereas the normal maximum flow during actual filtration approximates eight (8) gallons per minute per square foot of filtering area. While cleansing may, at least in some instances, be effected by use of a pump to force filtered water back through the openings of the filter-supports, this would require a pump having a capacity of about fifteen (15) times the capacity necessary for filtration. I therefore prefer to use the method first described.

The various parts and elements of the system which are exposed to the water may be made of stainless steel or similar material to reduce corrosion and promote cleanliness.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted, and some of the features of each modification may be embodied in the others, without interfering with the more general results outlined, and the invention extends to such use within the scope of the appended claims.

What I claim is:

1. A filter apparatus, comprising in combination, means providing an influent chamber, means providing an effluent chamber, liquid-pervious filtering means separating said chambers, means associated with said influent chamber for introducing liquid to be filtered thereinto under pressure, means for conducting filtrate from said effluent chamber, the first two-named means respectively forming an enclosed space for the trapping of air under the pressure existing in said chambers respectively during the operation of the apparatus in filtering liquid, means associated with said effluent chamber for restricting the flow of liquid therefrom during the continued introduction of liquid into said influent chamber so as to compress air in contact with the liquid in said effluent chamber, and means communicating with the air space associated with said influent chamber for suddenly venting compressed air therefrom for effecting a backwashing flow of filtrate through said liquid-pervious filtering means.

2. A filter apparatus in accordance with claim 1, comprising in addition, means for supplying diatomaceous earth to said influent chamber to build up the layer thereof on said filtering means, and means for disposing of the used diatomaceous earth and accumulated solid material displaced by the reverse flow of filtrate through said filtering means, the last named means comprising a valved passage communicating with the lower end portion of said influent chamber.

3. A filter apparatus, comprising in combination, a closed container, means including liquid-pervious filtering means associated therewith for dividing the interior of said container into two chambers, one of said chambers being an effluent chamber and the other, an influent chamber, the first named means further serving to prevent passage of fluid from one of said chambers to the other except through said filtering means, said filtering means being disposed in such a position in and with respect to said influent chamber as to provide a portion of this chamber in which air may be trapped in the operation of the apparatus, means for supplying liquid to be filtered under pressure to said influent chamber, means for conducting filtrate from a point of said effluent chamber such as to provide a portion of this chamber in which air may be trapped, the means for supplying liquid under pressure serving to compress air in the upper portion of each of said chambers, and valve-controlled passage means communicating between said portion of said influent chamber in which air may be trapped and the atmosphere for quickly venting trapped air from this portion of the influent chamber to the atmosphere, so that the sudden expansion of the air in said effluent chamber will cause a rapid reverse flow of filtrate through said liquid-pervious filtering means to clear such filtering means of accumulated solid material.

4. In the operation of a filter apparatus having influent and effluent chambers separated by liquid-pervious filtering means, and wherein a volume of air is trapped and compressed in contact with the liquid in each of said chambers respectively during the filtering operation, the method of causing a sudden reverse flow of filtrate through the liquid-pervious filtering means, which comprises the step of suddenly lowering the fluid pressure in the influent chamber by venting the volume of air in contact with liquid in the influent chamber to a space wherein the pressure is substantially lower than the pressure in the influent chamber prior to such venting.

5. A filter apparatus, comprising in combination, a closed container, a substantially horizontally disposed tube sheet across said container, imperforate tubes secured to and depending a predetermined distance below said tube sheet and closing access between the opposite sides thereof except through the interior of said tubes, filtering means associated with the lower ends of said tubes, the aforementioned parts being so constructed and arranged as to separate said container into an upper effluent chamber and a lower influent chamber and providing in said influent chamber above the lower ends of said tubes a portion in which air may be trapped, means for conducting a liquid to be filtered to said influent chamber at a point below the lower ends of said tubes, a valve in the last named means, means communicating with said effluent chamber a substantial distance below the upper end thereof for conducting filtrate therefrom and to provide an upper portion of this chamber wherein air may be trapped, a vent passage between the upper portion of said influent chamber and the atmosphere and having a quick-opening valve therein, means for forcing the liquid to be filtered through said conducting means into said influent chamber under pressure so as to compress air in the upper portions of both said chambers, a valve in the passage for conducting filtrate from said effluent chamber, and a valved passage communicating with the lower end of said influent chamber for the disposal of waste upon the cutting off of the inlet and outlet to said chambers by the associated valves and venting the air from the upper portion of said influent chamber to cause expansion of the air in said effluent chamber and thereby to cause a rapid reverse flow of filtrate through said filtering means to clear such filtering means of accumulated solid material, which may be removed from said influent chamber through the waste disposal means associated with the lower end thereof.

GEORGE MARTIN BOOTH.

REFERENCES CITED

The following references are of record in the file of this patent:

UNITED STATES PATENTS

| Number | Name | Date |
|---|---|---|
| 2,332,982 | Blair | Oct. 26, 1943 |
| 574,858 | Welshans | Jan. 5, 1897 |
| 2,258,063 | Meyer | Oct. 7, 1941 |
| 511,149 | Lamb | Dec. 19, 1893 |
| 1,288,508 | Chapin | Dec. 24, 1918 |
| 2,301,430 | Malanowski | Nov. 10, 1942 |
| 2,079,475 | Williams et al. | May 4, 1937 |
| 1,061,368 | Gilliam | May 13, 1913 |
| 2,165,931 | Levy | July 11, 1939 |
| 847,537 | Abbott | Mar. 19, 1907 |
| 545,221 | Brinckman et al. | Aug. 27, 1895 |
| 2,108,798 | Dalrymple | Feb. 22, 1938 |

FOREIGN PATENTS

| Number | Country | Date |
|---|---|---|
| 19,594 | Great Britain | Nov. 17, 1894 |
| 112,395 | Germany | Aug. 23, 1900 |